(12) United States Patent
Offenhaeuser

(10) Patent No.: US 10,009,580 B2
(45) Date of Patent: Jun. 26, 2018

(54) METHOD FOR SUPPLEMENTING A PIECE OF OBJECT INFORMATION ASSIGNED TO AN OBJECT AND METHOD FOR SELECTING OBJECTS IN SURROUNDINGS OF A VEHICLE

(71) Applicant: Robert Bosch GmbH, Stuttgart (DE)

(72) Inventor: Andreas Offenhaeuser, Marbach am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 303 days.

(21) Appl. No.: 14/420,293

(22) PCT Filed: Aug. 19, 2013

(86) PCT No.: PCT/EP2013/067244
§ 371 (c)(1),
(2) Date: Feb. 6, 2015

(87) PCT Pub. No.: WO2014/029738
PCT Pub. Date: Feb. 27, 2014

(65) Prior Publication Data
US 2015/0229885 A1 Aug. 13, 2015

(30) Foreign Application Priority Data
Aug. 21, 2012 (DE) .......... 10 2012 214 852

(51) Int. Cl.
*H04N 7/18* (2006.01)
*B60R 1/00* (2006.01)
(Continued)

(52) U.S. Cl.
CPC .............. *H04N 7/181* (2013.01); *B60R 1/00* (2013.01); *B60W 30/09* (2013.01);
(Continued)

(58) Field of Classification Search
None
See application file for complete search history.

(56) References Cited

U.S. PATENT DOCUMENTS 7,710,246 B2 * 5/2010 Arakawa ............. B62D 15/029
  180/271
9,702,966 B2 * 7/2017 Batcheller ............. G01S 15/025
(Continued)

FOREIGN PATENT DOCUMENTS

DE      199 51 001      5/2001
DE   10 2008 043200    10/2009
(Continued)

OTHER PUBLICATIONS

International Search Report for PCT/EP2013/067244, dated Nov. 26, 2013.

*Primary Examiner* — Kate Luo
(74) *Attorney, Agent, or Firm* — Norton Rose Fulbright US LLP; Gerard Messina

(57) ABSTRACT

A method for supplementing a piece of object information assigned to an object situated in surroundings of a vehicle includes: reading in a piece of sensor information; evaluating the sensor information; and expanding the object information. In the step of reading in, the piece of sensor information represents a response of a driver of the vehicle to an object situated in a viewing direction of the driver. In the step of evaluating, the sensor information is evaluated to obtain a piece of detection information representing whether the driver has detected the object. In the step of expanding, the object information is expanded with the piece of detection information.

10 Claims, 3 Drawing Sheets

(51) Int. Cl.
- *G06K 9/00* (2006.01)
- *B60W 30/09* (2012.01)
- *G08G 1/16* (2006.01)
- *B60W 40/08* (2012.01)

(52) U.S. Cl.
CPC ..... *G06K 9/00671* (2013.01); *G06K 9/00805* (2013.01); *G06K 9/00845* (2013.01); *G08G 1/165* (2013.01); *G08G 1/166* (2013.01); *B60W 2040/0818* (2013.01); *B60W 2040/0872* (2013.01); *B60W 2540/22* (2013.01)

(56) References Cited

U.S. PATENT DOCUMENTS

| | | | |
|---|---|---|---|
| 2004/0066376 A1* | 4/2004 | Donath | B60R 1/00 345/169 |
| 2006/0193509 A1* | 8/2006 | Criminisi | G06K 9/00241 382/154 |
| 2006/0267747 A1* | 11/2006 | Kondo | B60Q 9/008 340/435 |
| 2008/0077321 A1* | 3/2008 | Widodo | G01C 21/32 701/29.5 |
| 2008/0204208 A1* | 8/2008 | Kawamata | B60R 1/00 340/435 |
| 2008/0215231 A1* | 9/2008 | Breed | G08G 1/161 701/117 |
| 2009/0237644 A1* | 9/2009 | Uechi | B60W 30/10 356/29 |
| 2009/0303078 A1* | 12/2009 | Mochizuki | B60W 40/02 340/901 |
| 2010/0007728 A1* | 1/2010 | Strauss | B60R 21/0134 348/118 |
| 2010/0128222 A1* | 5/2010 | Donaldson | A61B 3/0091 351/210 |
| 2011/0285982 A1* | 11/2011 | Breed | B60N 2/002 356/4.01 |
| 2012/0089321 A1 | 4/2012 | Jung | |
| 2012/0307059 A1 | 12/2012 | Yamakage et al. | |

FOREIGN PATENT DOCUMENTS

| | | |
|---|---|---|
| DE | 10 2011 084367 | 4/2013 |
| EP | 1 484 014 | 12/2004 |
| JP | 2001-199296 A | 7/2001 |
| JP | 2005-231450 A | 9/2005 |
| WO | WO 2011/064831 | 6/2011 |

* cited by examiner

METHOD FOR SUPPLEMENTING A PIECE OF OBJECT INFORMATION ASSIGNED TO AN OBJECT AND METHOD FOR SELECTING OBJECTS IN SURROUNDINGS OF A VEHICLE

BACKGROUND OF THE INVENTION

1. Field of the Invention

The present invention relates to a method for supplementing a piece of object information assigned to an object, to a method for selecting objects in surroundings of a vehicle, to a corresponding device, and to a corresponding computer program product.

2. Description of the Related Art

Published German patent application document DE 199 51 001 A1 describes a device for displaying information in a vehicle. The display of information is overlaid into a field of vision of the driver from various data sources.

BRIEF SUMMARY OF THE INVENTION

Against this background, the present invention introduces a method for supplementing a piece of object information assigned to an object, a method for selecting objects in surroundings of a vehicle, a corresponding device, and a corresponding computer program product.

An object situated in the surroundings of the vehicle, in particular an object situated in the area ahead of the vehicle, may in some circumstances not be detected or not be consciously perceived by the driver of a vehicle. A non-detection of an object may have various reasons. For example, the object itself may be difficult to detect, for example due to adverse weather conditions, or the driver may be distracted or exhausted. But even an attentive driver may overlook an object, for example because an instantaneous driving situation may be particularly challenging for him/her. With the aid of the approach according to the present invention, it is possible to ascertain whether the driver has detected an object or has not detected an object. Detection information ascertained with respect to the object, indicating whether or not the object has been detected by the driver, may be used by a driver assistance system of the vehicle, for example. For example, a relevant object, which is assumed not to have been detected by the driver, may be particularly highlighted.

A method for supplementing a piece of object information which is assigned to an object situated in surroundings of a vehicle includes the following steps:

reading in a piece of sensor information which represents a response of a driver of the vehicle to the object situated in a viewing direction of the driver;

evaluating the piece of sensor information to obtain a piece of detection information, the detection information indicating the detection of the object by the driver; and expanding the object information with the piece of detection information.

The object may be an obstacle, another road user, a traffic sign, an animal, a pedestrian or a child, for example. The object may represent an object recorded by a surroundings recording device of the vehicle. Using an object detection device, for example, it is possible to ascertain a piece of object information with respect to the object and assign it to the object. A piece of object information may be understood to mean a collection of attributes on an object. The object information may be a data set. For example, the object information may be a piece of information about an object class of the object, a position of the object in relation to the vehicle, a viewing angle of the driver in the direction of the object and/or a piece of information about a collision hazard of the vehicle with the object. The object information may thus represent different properties of the object. The sensor information may be a piece of information provided by a sensor, for example an image sensor, which is designed to record the driver. The response may be, for example, a viewing direction, a viewing duration, a movement, such as a head movement or an arm or a leg movement. A response may also be an interruption of the movement. The response may refer to a viewing direction of the driver. The response may be characteristic of the detection of the object. If the driver does not detect the object, the driver will not display any response with respect to the object or will display a response which deviates from a response indicating the detection. In the step of expanding, the detection information may be added to the object information or an existing piece of detection information may be replaced.

The detection information may represent a likelihood of the detection of the object by the driver. The detection information may thus be a likelihood of the driver having detected or of not having detected the object. In the case of a response which is considered strong, it may be inferred with a great likelihood that the driver has detected the object. In the case of a response which is considered low, it may be inferred with a low likelihood that the driver has detected the object. For example, a long observation duration may represent a higher detection likelihood than a short observation duration.

The sensor information may represent a spatial position of a fixation axis of an eye region of the driver. The eye region may represent the position of the face or one of the eyes of the driver, for example. In the step of evaluating, a residence time may be evaluated, during which the fixation axis is directed at the object. Fixation may be understood to mean a targeted observation of (fixation on) an object; a fixation axis or fixation direction may be understood to mean a straight line between the point of the retina having the highest resolution and the fixation object (visual axis) or a primary physiological viewing direction of the eye. If the fixation axis intersects a visible surface of an object and resides there, it may be assumed with a great likelihood that the driver sees the object. The fixation axis may be recorded with the aid of a viewing direction recording device.

In the step of evaluating, the detection information may indicate that the object was not detected if the fixation axis is directed at the object for a period shorter than the detection duration. On the other hand, the detection information may indicate that the object was detected if the fixation axis is directed at the object for a period longer than the detection duration. If it is detected in the step of evaluating, for example, that the fixation axis passes over an object without delay, it may be assumed that the driver has not detected the object. In this case, the detection information may be determined or assigned in such a way that it does not indicate a detection, i.e., indicates a non-detection of the object. To detect the object, the driver typically fixes on distinctive spots on the object and attempts to assign the spots to the object. The driver requires a short time period for this, the detection duration.

In the step of evaluating, the detection information, which indicates the detection of the object by the driver, may be set to the state of non-detection of the object if the fixation axis is not directed at the object for a period longer than an attention span. The detection information may thus be determined as "undetected" if the fixation axis is not directed at the object for a period longer than the attention span after the driver has detected the object. If the driver has not looked at the object for a period longer than the attention span, the object may again be classified as undetected. In this way, it is possible to take into consideration, for example, that the driver has forgotten about the object after detection.

In the step of evaluating, the detection information may indicate a detection of the object, i.e., the detection information may be determined as "undetected," if a position of the object relative to the vehicle changes by more than a predetermined value, and the fixation axis is not directed at the object within a response time. The view of the driver is generally attracted by a movement of the object. In particular under difficult visual conditions, the detection may only be made possible by the movement of the object. When the object moves and the driver does not respond, the likelihood is great that the driver has not detected the object.

A method for selecting objects in surroundings of a vehicle, an object detection function of the vehicle being designed to provide object information about the objects, includes the following steps:

expanding the object information with detection information according to a described method for supplementing;

selecting those among the objects whose detection information indicates that the driver has not detected the particular object, to obtain an object group; and providing the object information of the object group to an interface to a driver assistance system of the vehicle.

For example, the driver assistance system may be a display unit or a safety device, such as a brake assistance system. For example, the object information of the objects of the object group may be provided for a display unit for a driver of the vehicle when the objects are situated within a representation area of the display unit. A display unit may be a driver visual field display of the vehicle. The display unit may also be a monitor in the vehicle. A representation area may be a section from the surroundings of the vehicle. The objects and/or object information within the section may be represented on the display unit. By representing only the undetected objects, a flood of information for the driver may be reduced, since only undetected objects need to be highlighted on the display unit. A highlighting of detected objects may act in a disruptive manner since a parallax error may exist between an image of the object and the real object in the surroundings.

The object information of the objects selected based on the hazard level, expanded with the detection information, may be provided on the display unit to particularly highlight these objects. For example, such objects may be represented in a flashing manner, in conjunction with an icon and/or with a signal color.

In the step of selecting, hazardous objects may be selected which have not been detected by the driver and for which a collision hazard exists. For this purpose, in each case a hazard level of the objects may be read in, the hazard level representing a likelihood of a collision of the object with the vehicle. It is possible to select hazardous objects which have not been detected by the driver and for which a collision hazard exists, i.e., which have a hazard level which is greater than a threshold value, for example. A collision signal may be provided for a safety system of the vehicle, using the object information of the hazardous objects. A hazard level may be calculated using precalculated trajectories of the vehicle and of the objects. The threshold value may be exceeded when a collision is impending, for example. Using the display unit, for example, a pedestrian may be highlighted, who will walk in front of the vehicle unless he/she stops. If the driver detects the pedestrian, it is no longer necessary to further highlight the pedestrian. However, if the driver does not detect the pedestrian, an autonomous braking process may be initiated, for example based on the collision signal.

The present approach may be used in the field of driver assistance systems. In the field of driver assistance systems, the detection, classification and (semi-)autonomous influencing of the vehicle as a function of the situation presenting itself in the surroundings of the vehicle play an ever greater role. Depending on the condition of the driver, his/her own response may be different, and his/her response to a system intervention may also be different. The information on whether the driver is aware of the present situation, e.g., that a pedestrian is walking toward the street, may reduce a faulty trigger rate of driver assistance systems.

The approach presented here may combine an object detection by a surroundings sensor system, e.g., radar, LIDAR, video or ultrasound, an object classification using algorithms, a distinction between a pedestrian, a vehicle, a stationary object and other objects, an assessment of the hazard for the instantaneous vehicle, and a detection of the driver viewing direction and his/her head position. In particular, an exact detection of the pupil, and thus of the spot on which the driver is focusing, and not only the general viewing direction of the driver, may be used for the approach presented here.

The present invention further creates a device which is designed to carry out or implement the steps of at least one of the methods according to the present invention in corresponding systems. The object of the present invention may also be achieved quickly and efficiently by this embodiment variant of the present invention in the form of a device.

A device in the present invention may be understood to mean an electrical device which processes sensor signals and outputs control signals and/or data signals as a function thereof. The device may include an interface which, may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete components. In the case of a software design, the interfaces may be software modules which are present on a microcontroller, for example, in addition to other software modules.

In addition, a computer program product is advantageous, having program code which may be stored on a machine-readable carrier such as a semiconductor memory, a hard disk memory or an optical memory, and which is used to carry out the method according to one of the specific embodiments described above, if the program product is executed on a computer or a device.

The present invention is described in greater detail hereafter based on the accompanying drawings by way of example.

DETAILED DESCRIPTION OF THE INVENTION

Figure 1:
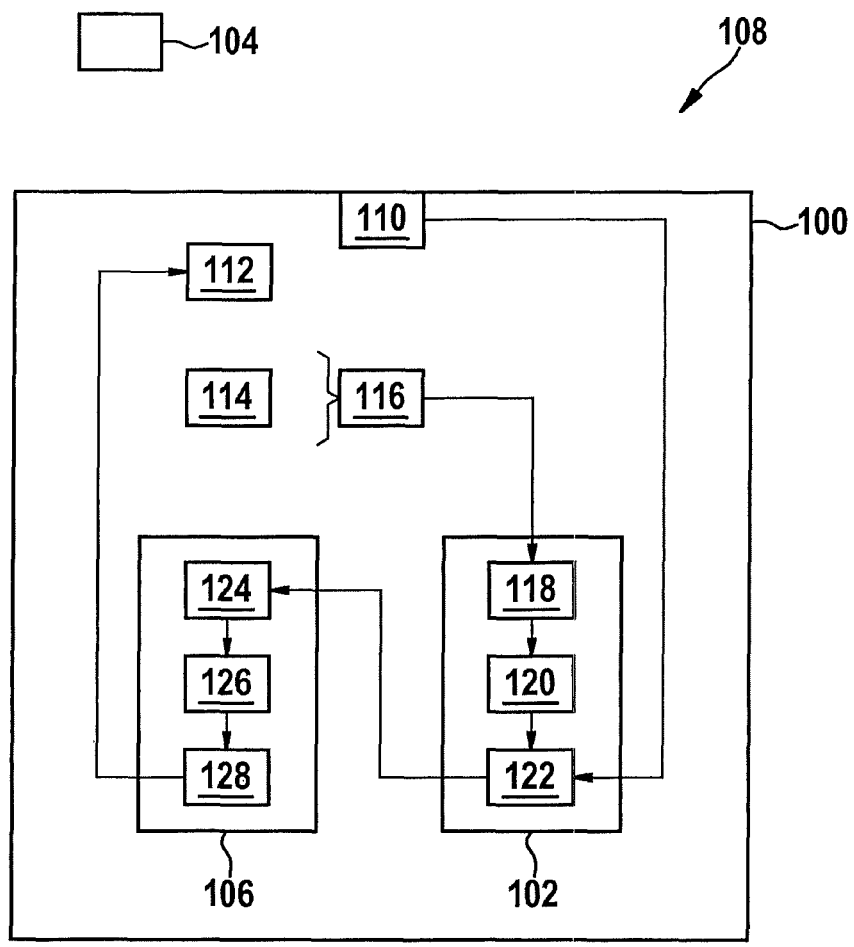
FIG. 1 shows an illustration of a vehicle having a device for supplementing a piece of object information assigned to an object and a device for selecting objects in surroundings of the vehicle according to one exemplary embodiment of the present invention.

In the following description of preferred exemplary embodiments of the present invention, identical or similar reference numerals are used for similarly acting elements shown in the different figures, and a repeated description of these elements is dispensed with.

FIG. 1 shows an illustration of a vehicle 100 having a device 102 for supplementing a piece of object information assigned to an object 104 and a device 106 for selecting objects 104 in surroundings 108 of vehicle 100 according to one exemplary embodiment of the present invention. Vehicle 100, for example a motor vehicle driving on a road, includes a surroundings recording device 110, a display unit 112 for a driver 114 of vehicle 100, and a driver recording device 116. Surroundings recording device 110 and driver recording device 116 are connected to device 102 for supplementation. Surroundings recording device 110 is designed to provide object information on objects 104 in surroundings 108 of vehicle 100. Driver recording device 116 is designed to provide a piece of sensor information which represents a response of a driver 114 of vehicle 100 to object 104 situated in a viewing direction of driver 114. For example, driver recording device 116 may be designed as a measuring system for detecting the driver's eyes viewing direction. For this purpose, driver recording device 116 may include an image recording device and a suitable image evaluation device, for example.

Device 102 for supplementation includes a unit 118 for reading in the sensor information, a unit 120 for evaluating the sensor information, and a unit 122 for expanding the object information. Unit 118 for reading in is designed to read in the sensor information from driver recording device 116. Unit 120 for evaluation is designed to evaluate the sensor information to obtain a piece of detection information. The detection information represents a result of the evaluation of whether or not driver 114 has detected object 104. Unit 122 for expansion is designed to expand, or supplement, the object information received from surroundings recording device 110 with the piece of detection information.

Device 102 for supplementing the object information assigned to object 104 is connected to device 106 for selection. Device 106 for selection includes a unit 124 for reading in, a unit 126 for selection, and a unit 128 for provision. Unit 124 for reading in is designed to receive the object information from device 102 for supplementation. Unit 126 for selection is designed to select objects whose detection information represents that driver 114 has not detected the object, to obtain an object group. Unit 128 for provision is connected to display unit 112. Unit 128 for provision is designed to provide the object information of the object group for display to driver 114. In this way, in particular objects which the driver has not yet detected are displayed via display unit 112 to driver 114. Objects 104 which driver 114 has already detected are not displayed any longer, so as not to distract the driver from surroundings 108.

Unit 128 for provision may furthermore or alternatively be designed to provide the object information which has been supplemented with the detection information to another driver assistance system. Device 102 for selecting objects 104 is optional. If no device 102 for selection is provided, the object information which has been supplemented by device 102 for supplementation with the detection information may be directly provided to a driver assistance system or display unit 112, for example. The display unit may be implemented as a monitor, for example, or as a projection device, such as a head-up display.

Figure 2:
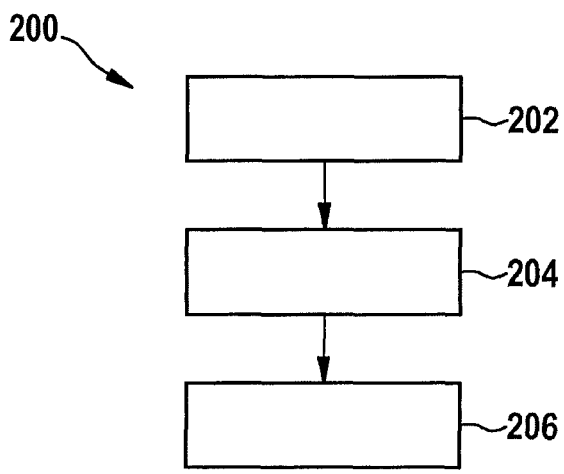
FIG. 2 shows a flow chart of a method for supplementing a piece of object information assigned to an object according to one exemplary embodiment of the present invention.

FIG. 2 shows a flow chart of a method 200 for supplementing a piece of object information assigned to an object according to one exemplary embodiment of the present invention. The object is situated in surroundings of a vehicle. For example, the steps of the method may be carried out on units of the device for supplementation shown in FIG. 1. The method includes a step 202 of reading in, a step 204 of evaluating, and a step 206 of expanding. In reading-in step 202, a piece of sensor information from a driver recording sensor, as it is shown in FIG. 1, is read in. The sensor information represents a response of a driver of the vehicle to the object situated in a viewing direction of the driver. In step 204 of evaluating, the sensor information is evaluated to obtain a piece of detection information. The detection information represents a result of the evaluation of whether the driver has detected the object. In step 206 of expanding, the object information provided by a surroundings recording device is expanded with the detection information.

Figure 3:
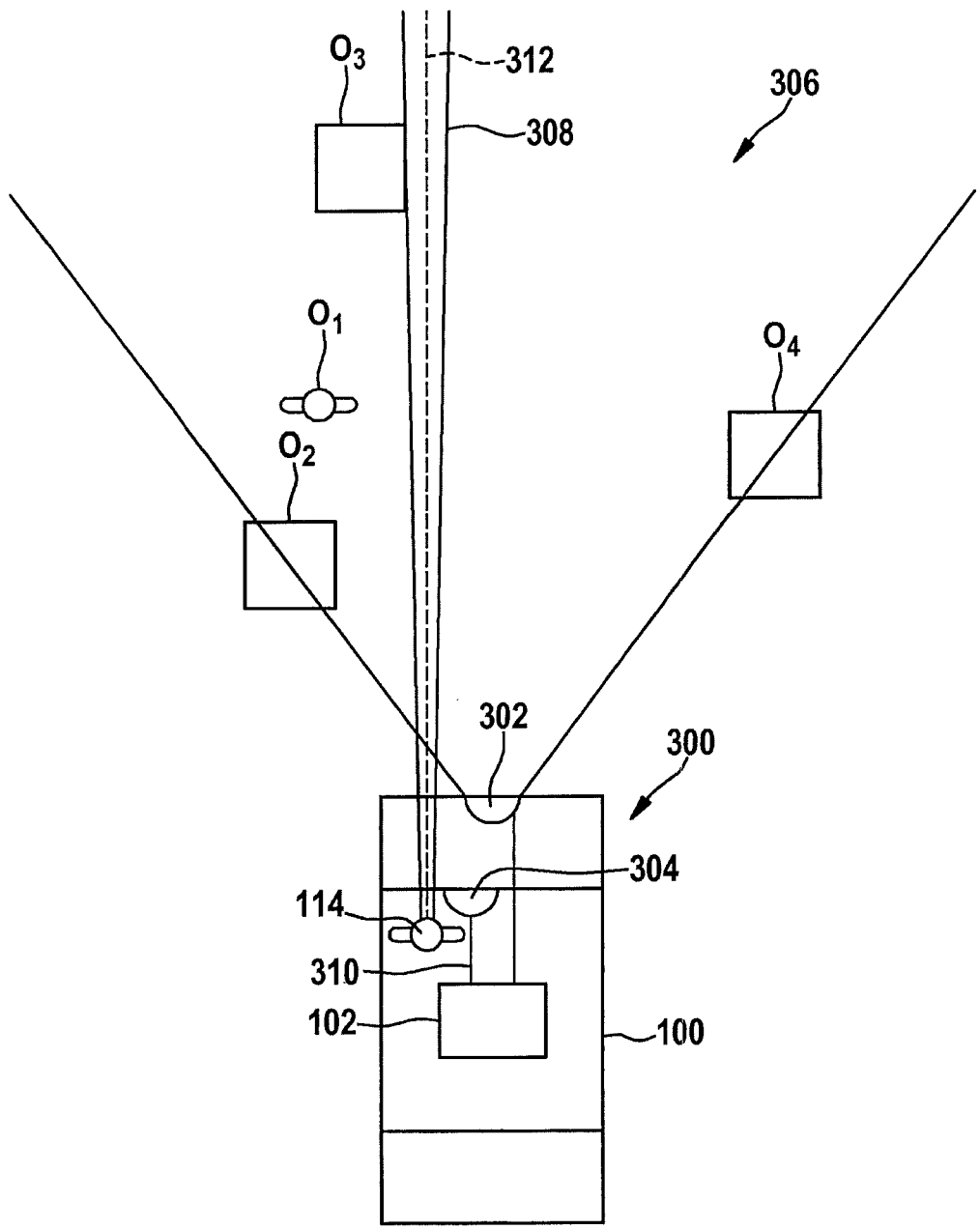
FIG. 3 shows an illustration of a vehicle having a system for additionally classifying the object using a viewing direction of the driver according to one exemplary embodiment of the present invention.

FIG. 3 shows an illustration of a vehicle 100 having a system 300 for additionally classifying the object using a viewing direction of the driver according to one exemplary embodiment of the present invention. System 300 includes a radar sensor 302, a driver recording device having a measuring system 304 directed at a driver 114 of vehicle 100 for detecting the viewing direction of the driver's eyes, and a device 102 for supplementation, as it is shown in FIG. 1, for example.

Radar sensor 302 has a detection range 306, which according to this exemplary embodiment extends in a wedge shape ahead of vehicle 100. In this exemplary embodiment, four objects O1, O2, O3, O4 are situated in detection range 306, which are detected by radar sensor 302. Using a piece of object information assigned to object O1, object O1 is classified as a person and situated in detection range 306. Corresponding position information may be stored in the object information assigned to object O1. Object O1 is situated more than one vehicle length ahead of vehicle 100. Object O2 is situated at the left edge of the detection range. Object O2 is not classified in greater detail. Object O3 is situated centrally in detection range 306 and is situated further away from vehicle 100 than object O1. Object O3 is also not classified in greater detail. Object O4 is situated at a right edge of detection range 306, is not classified, and is situated further away from vehicle 100 than object O2 and closer to vehicle 100 than object O1. There is sufficient space between objects O3, O4 to pass through with vehicle 100. Object O3 is situated at a left edge of an anticipated driving path of vehicle 100.

Measuring system 304 directed at driver 114 is situated in front of driver 114 and is designed to detect a head position of driver 114 and a viewing direction 308 of the eyes of driver 114, as long as the head of driver 114 is situated within a detection range 310 of measuring system 304. Detection range 310 is directed at an averaged position of the head in a wedge shape here. Viewing direction 308 is shown as a "tunnel" in this exemplary embodiment, which proceeding from an eye region of driver 114 is situated around a fixation axis 312 of at least one of the eyes, or of the dominant eye, of driver 114. A cross sectional surface of the "tunnel" corresponds to the surface which driver 114 is able to fully perceive without moving the eyes and/or moving the head. Fixation axis 312 directly and rectilinearly connects a center of the surface to the eye. Measuring system 304 is able to ascertain the position of fixation axis 312 in the space based on a position of the eyes and an orientation of the eyes on the position.

Object O3 is situated in viewing direction 308 of driver 114. Device 102 is designed to receive the positions of objects O1, O2, O3, O4, for example as a distance from radar sensor 302 and as an angle relative to a center line of vehicle 100, as object information which is assigned to objects O1, O2, O3, O4 via an interface from radar sensor 302. Device 102 is furthermore designed to receive additional object information about objects O1, O2, O3, O4, for example the detected class "person" for object O1 and a surface of objects O1, O2, O3, O4 visible from the view of driver 114.

Device 102 is moreover designed to receive information about viewing direction 308 of the driver from measuring system 304, for example as a vector having coordinates of at least one eye as an interpolation point. Device 102 is designed to ascertain, via a spatial analysis, whether one or multiple of objects O1, O2, O3, O4 are situated in viewing direction 308. In this exemplary embodiment, viewing direction 308 is directed at a right edge of object O3. If viewing direction 308 remains on the edge of object O3 long enough, a likelihood that driver 114 has detected object O3 is great. As a result, object O3 may be assigned an attribute "detected" and this may be noted as detection information in a piece of object information about object O3.

In other words, FIG. 3 shows an exemplary implementation of the approach presented here. With the aid of radar sensor 302, the surrounding objects $O_n$ are detected and an object detection function (e.g., ACC) is carried out. Further measuring system 304 is directed at driver 114 and records his/her head and pupil position and, based thereon, calculates viewing direction 308 of driver 114. The approach presented here refers in each case to the obtained information of the two systems 302, 304 and the combination of these data. The goal here is to establish whether or not driver 114 has already seen object $O_n$ which was detected by radar 302. This additional information about object $O_n$ allows installed assistance systems to respond to objects $O_n$ in a more targeted manner. Human machine interface systems (HMI systems) may thus also overlay in a targeted manner only information which is relevant for driver 114, i.e., of which driver 114 is not aware yet.

Figure 4:
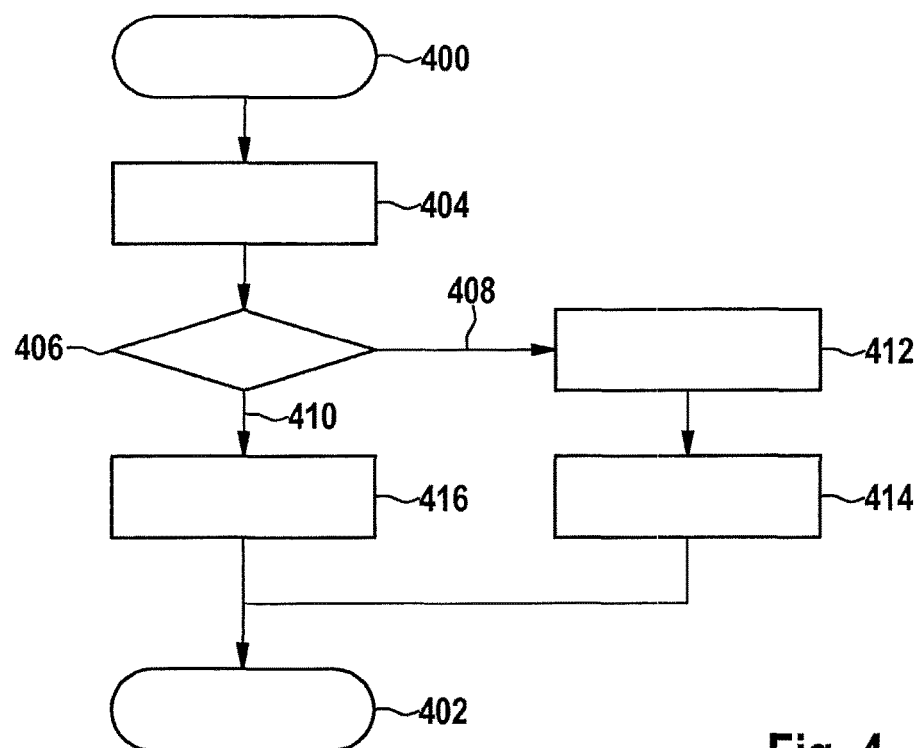
FIG. 4 shows a flow chart of a method for supplementing a piece of object information assigned to an object according to one exemplary embodiment of the present invention.

FIG. 4 shows a flow chart of a method 200 for supplementing a piece of object information assigned to an object according to one exemplary embodiment of the present invention. For example, the steps of the method may be carried out on units of the device for supplementation shown in FIG. 1.

The flow chart maps a decision-making loop in each case for an object $O_n$, as shown in FIG. 3. The decision-making loop is carried out for each of objects $O_n$. After a start 400 of the decision-making loop, an intersection of object $O_n$ and viewing direction $V_G$ is calculated for each object $O_n$ in an action 404. It is analyzed for this purpose whether the viewing direction meets the object. Subsequently a poll 406 is carried out. It is polled in poll 406 whether object $O_n$ has shared points with $v_G$, i.e., whether the intersection is greater than zero. If the answer to poll 406 is "Yes" 408, object $O_n$ is situated in viewing vector $v_G$ of the driver. If the answer to poll 406 is "No" 410, the driver does not see object $O_n$. In the case of "Yes" 408, an action 412 takes place. In action 412, a residence time $t_n$ of the view onto object $O_n$ is measured. Using residence time $t_n$, a likelihood $p_n$ that the object was cognitively perceived is calculated in a subsequent action 414, for example, using a processing rule, such as $p_n$ new=10*$t_n$. In the case of "No" 410, a previously calculated or a previously assigned detection likelihood of 0% is maintained in an action 416. $P_n$ new=$P_n$ old. The loop reaches its end 402 with the assignment of the new detection likelihood $p_n$ new.

The combination of object data $O_n$ from the radar and the viewing direction G of the driver may take place as described in FIG. 4. A cyclical function call calculates for each object $O_n$ whether it is situated in the viewing range of the driver and, based thereon, infers a likelihood with which the driver has (cognitively) perceived the object. Objects $O_n$ which are newly detected by the radar are initialized with a likelihood of 0%. Radar objects $O_n$ are known in terms of $X_n$, $Y_n$, $Z_n$ coordinates and dimension. The viewing direction of the driver may be ascertained as directional vector $v_G$ with interpolation point $X_G$, $Y_G$, $Z_G$.

In other words, FIG. 4 shows an approach for additionally classifying the object using the viewing direction of the driver or a visual axis of a driver of the vehicle.

With the aid of the information about the head position and viewing direction of the driver as well as the installation position of the sensors used, the view of the driver in the three-dimensional space around the vehicle may be calculated. It is possible to take over information about objects in the surroundings and their classification from existing sensors and their associated algorithms. If the pieces of information of the two systems—viewing direction and ambient objects—are now linked, it is possible to identify therefrom which objects are presently situated in the view of the driver. Using algorithms, it is now possible to carry out an additional object classification, which indicates how great the likelihood is that the driver has completely detected this object and is aware of the hazard.

These pieces of information may be used for multiple fields of application, for example, for adapting intervention thresholds of active safety systems, e.g., emergency braking assistance system or autonomous evasion functions. If it is known, for example, that the driver does not have the object posing the hazard in his/her sight in the hazardous situation, gentle deceleration may be initiated at an early stage, so that the driver becomes aware of the situation and thus actively assumes control. In the event that the driver is aware of the situation and still does not brake, a fully autonomous braking process may be initiated to thus prevent an accident. In this way, the possibility of a misjudgment of the driver may be precluded or minimized. For example, the attention of the driver may be drawn to the occurring, undetected hazard, e.g., by acoustic signals, flashing light, or HUD overlays (head-up display overlays). During attentiveness monitoring, it is possible to draw the attention of the driver to his/her negligence by an acoustic signal if the driver has turned away from the traffic scene (looking into the vehicle interior)

for an extended period. In this way, the driver may turn his/her attention back to the traffic scene. For example, the information may be used for overlaying on the HUD information which the driver has not detected or is not very likely to have detected, e.g., with sign detection. If the driver overlooks a traffic sign, the information displayed by the traffic sign, for example speed limits, no-passing zones or the like, may be overlaid on the HUD until the view of the driver detects the information on the HUD.

Figure 5:
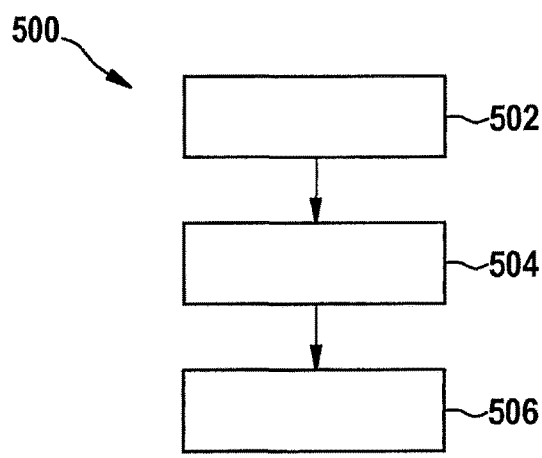
FIG. 5 shows a flow chart of a method for selecting objects in surroundings of a vehicle according to one exemplary embodiment of the present invention.

FIG. 5 shows a flow chart of a method 500 for selecting objects in surroundings of a vehicle according to one exemplary embodiment of the present invention. As described in FIGS. 1 and 3, an object detection function of the vehicle provides object information on relevant objects. The object information is supplemented with detection information using a described method.

Method 500 includes a step 502 of reading in, a step 504 of selecting, and a step 506 of providing. In step 502, the object information on detected objects is read in. In step 504 of selecting, some or all of the detected objects are selected to form an object group. For this purpose such objects are selected whose detection information represents that the driver has not detected the object. In step 506, the object information of the object group is provided. The object information of the object group may be used for risk assessments and for driver information.

The described exemplary embodiments shown in the figures are selected only by way of example. Different exemplary embodiments may be combined with each other completely or with respect to individual features. It is also possible to supplement one exemplary embodiment with features of another exemplary embodiment. Moreover, method steps according to the present invention may be carried out repeatedly and in a different order than the one described. If one exemplary embodiment includes an "and/or" link between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for supplementing object information which is assigned to objects situated in surroundings of a vehicle, comprising:
   reading in a piece of sensor information which represents a response of a driver of the vehicle to the objects situated in a viewing direction of the driver;
   evaluating the sensor information to obtain respective detection information for each of the objects, the detection information for each of the objects including an indication of whether the driver has detected the object;
   expanding the object information of each of the objects with the respective detection information; and
   displaying, on a display device of the vehicle, a representation of only those of the objects whose detection information indicates that the driver has not detected the object while simultaneously omitting the display of the others of the objects.

2. The method as recited in claim 1, wherein in the step of evaluating, each of the respective detection information represents a likelihood that the object is detected by the driver.

3. The method as recited in claim 1, wherein in the step of reading in, the sensor information represents a spatial position of a fixation axis of an eye region of the driver, and wherein in the step of evaluating, a residence time is evaluated, during which the fixation axis is directed at the each of the objects.

4. The method as recited in claim 3, wherein in the step of evaluating, each of the respective detection information indicates no detection of the respective object when the fixation axis is directed at the object for a period shorter than the detection duration, and the detection information indicates a detection of the respective object when the fixation axis is directed at the object for a period longer than the detection duration.

5. The method as recited in claim 3, wherein in the step of evaluating, each of the detection information which indicates the detection of the respective object by the driver is set to the state of no detection of the respective object when the fixation axis is not directed at the respective object for a period longer than a specified attention span.

6. The method as recited in claim 1, wherein in the step of evaluating, the respective detection information indicates a non-detection of the respective object when a position of the respective object relative to the vehicle changes by more than a predetermined value and the fixation axis is not directed at the respective object within a specified response time.

7. A method for selecting an object group in surroundings of a vehicle, comprising;
   providing, by an object detection function of the vehicle, object information on objects in the surroundings of the vehicle;
   expanding the object information on the objects in the surroundings of the vehicle by:
   reading in a piece of sensor information which represents a response of a driver of the vehicle to each respective object in the surroundings of the vehicle;
   evaluating the sensor information to obtain a piece of detection information, the detection information including an indication of whether the driver has detected the respective object; and
   expanding the object information for each respective object in the surroundings of the vehicle with the piece of detection information;
   selecting, among the objects in surroundings of the vehicle, only those particular ones of the objects whose detection information indicates the driver has not detected the particular objects, wherein the selected particular objects form the object group, the other objects in the surroundings of the vehicle being omitted from the object group; and
   providing the object information of the object group to a driver assistance system of the vehicle.

8. The method as recited in claim 7, wherein:
   in the step of selecting, hazardous objects are selected which have not been detected by the driver and for which a collision hazard exists; and
   in the step of providing, a collision signal is provided for the driver assistance system of the vehicle using the object information of the hazardous objects.

9. A device for selecting an object group in surroundings of a vehicle, comprising;
   a control unit including a processor configured to perform the following:
   providing, by an object detection function of the vehicle, object information on objects in the surroundings of the vehicle;
   expanding the object information on the objects in surroundings of the vehicle by:

reading in a piece of sensor information which represents a response of a driver of the vehicle to each respective object in the surroundings of the vehicle;

evaluating the sensor information to obtain a piece of detection information, the detection information including an indication of whether the driver has detected the respective object; and expanding the object information for each respective objection in the surroundings of the vehicle with the piece of detection information;

selecting, among the objects in surroundings of the vehicle, only those particular one of the objects whose detection information indicates the driver has not detected the particular objects, wherein the selected particular objects form the object group, the other objects in the surroundings of the vehicle being omitted from the object group; and providing the object information of the object group to a driver assistance system of the vehicle.

10. A non-transitory, computer-readable data storage medium storing a computer program having program codes which, when executed on a computer, perform a method for selecting an object group in surroundings of a vehicle, the method comprising;

providing, by an object detection function of the vehicle, object information on objects in the surroundings of the vehicle;

expanding the object information on the objects in the surroundings of the vehicle by:

reading in a piece of sensor information which represents a response of a driver of the vehicle to each respective object in the surroundings of the vehicle;

evaluating the sensor information to obtain a piece of detection information, the detection information including an indication of whether the driver has detected the respective object; and expanding the object information for each respective objection in the surroundings of the vehicle with the piece of detection information;

selecting, among the objects in the surroundings of the vehicle, particular ones of the objects whose detection information indicates the driver has not detected the particular objects, wherein the selected particular objects form the object group, the other objects in the surroundings of the vehicle being omitted from the object group; and providing the object information of the object group to a driver assistance system of the vehicle.

\* \* \* \* \*